Sept. 23, 1947.   J. M. GWINN, JR   2,427,962
AIRCRAFT CONTROL STICK
Filed Sept. 18, 1944
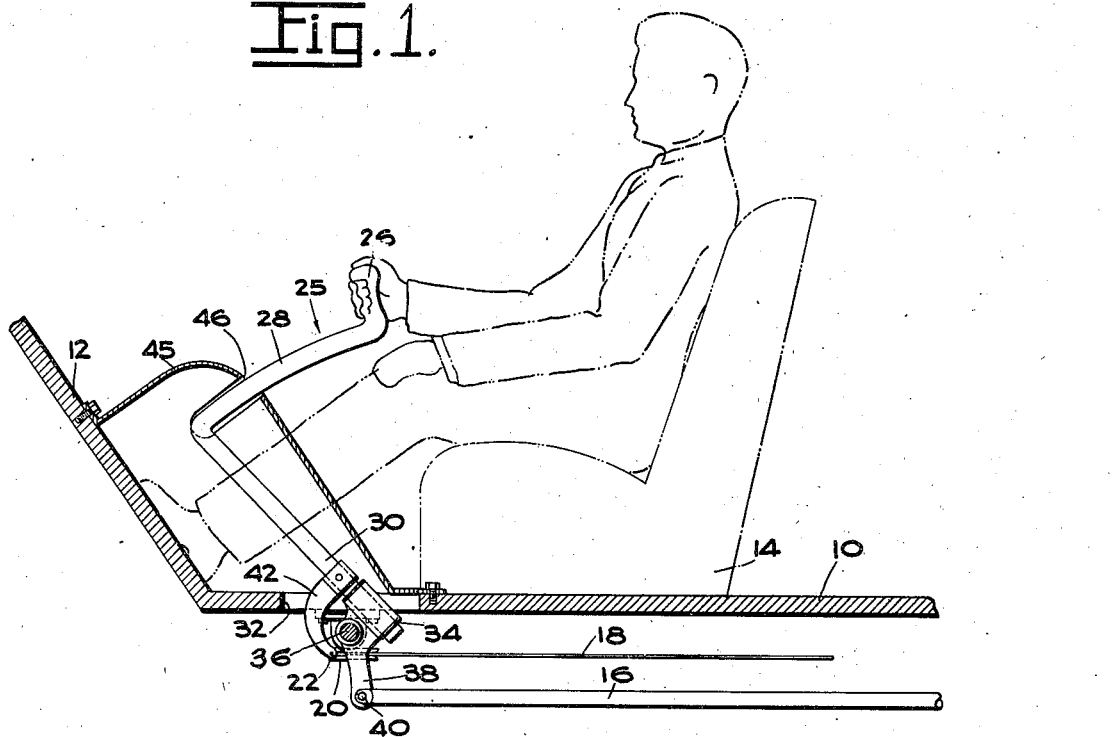
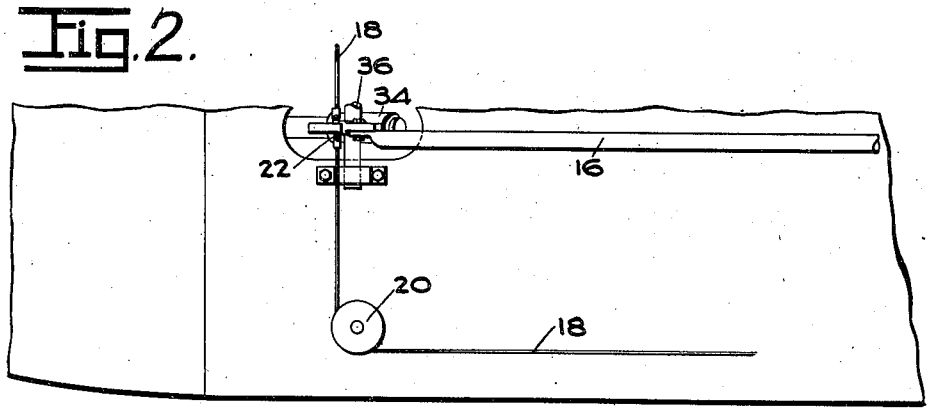
INVENTOR.
JOSEPH M. GWINN, JR.
BY
Beau, Brooks, Buckley & Beau.

Patented Sept. 23, 1947

2,427,962

UNITED STATES PATENT OFFICE 2,427,962

AIRCRAFT CONTROL STICK

Joseph M. Gwinn, Jr., San Diego, Calif.

Application September 18, 1944, Serial No. 554,631

7 Claims. (Cl. 244—83)

This invention relates to aircraft, and more particularly to an improved pilot-controlled device for adjusting airplane pitch and turn control surfaces and the like.

One of the objects of the invention is to provide an improved "stick" type pilot control device for actuating the elevation and turning control surfaces such as the elevator and aileron or rudders. Another object is to provide a pilot stick type control device for the purpose aforesaid which is so arranged as to involve minimum interferences with the pilot's feet and no interferences with the pilot's legs, nor with the feet or legs of passengers seated next to the pilot.

Other objects and advantages of the invention will appear from the specification hereinafter.

In the drawing:

Fig. 1 is a fragmentary side elevation of a pilot control mechanism of the invention; and Fig. 2 is a fragmentary bottom plan thereof.

In the drawing the invention is illustrated in conjunction with an airplane having a pilot compartment partially defined by a horizontal floor line 10 and a forwardly inclined floor line 12 ahead of the pilot's seat 14. It is contemplated that the control mechanism of the invention be applied to an airplane having any conventional elevator control means such as a push pull member 16 extending from the rear end of the airplane forwardly into the region of the pilot compartment. Also, the turn control mechanism of the airplane is shown to comprise a conventional cable system 18 trained about pulleys 20 at opposite sides of the airplane center line so as to lead the connection end portions of the cables 18—18 laterally and inwardly to a central connector 22.

The pilot operable control mechanism is shown to comprise a generally L-shaped stick 25 having an upstanding end grip portion 26 leading into a forwardly and downwardly inclining arcuately shaped body portion 28 which is so provided as to clear the legs and knees of the pilot and to extend forwardly and downwardly generally parallel to the directions of the pilot's legs into close proximity to the inclined floor-board section 12 whereupon it leads into a right angled body portion 30 directed further downwardly but rearwardly between the angles of the pilot. At its lower end the stick body portion 30 extends through a suitably apertured portion 32 of the floor structure 10 and is journaled upon a bearing block 34 so as to be freely rotatable about the longitudinal axis of the stick body portion 30. Thus, it will be understood that the hand grip portion 26 of the control stick may be freely oscillated by the pilot from side to side. The block 34 is pivotally mounted upon a cross bar 36 carried by the airplane frame so as to be rockable in fore-and-aft directions as well as rotatable in the bearing block 34; and the axis of the bar 36 is preferably arranged to be either relatively close to or intersecting the axis of the stick body portion 30. The hand grip portion 26 is preferably disposed at a position substantially directly over the position of the pivot bar 36 so that when the control stick is pulled back the free end of the control stick does not lower too steeply into the lap of the pilot. A horn 38 extends from the bearing block 34 integrally therewith and terminates at a pivotal connection at 40 with one end of the push pull member 16. A second horn 42 is keyed to the stick body portion 30 to extend radially therefrom and to carry at its free end the cable connector device 22. Preferably, the horn 42 is so shaped that it carries the connector 22 as closely as possible to the axis of the pivot bar 36.

Thus, it will be appreciated that pilot manipulations of the hand grip 26 so as to rock the control stick 25 in fore-and-aft directions will cause the horn 38 to actuate the push pull member 16 for corresponding adjustments of the connected elevator or other pitch control means of the airplane; while sidewise displacement by the pilot of the hand grip portion 26 will rotate the stick body portion 30 in the socket 34 in such manner as to oscillate the control horn 42 to move the cable system 18—18 actuating the turn control surface or surfaces of the airplane. If desired, a sheet metal housing or the like as indicated at 45 may be provided to enclose the lower end portion of the control stick 25 and the extending horn devices thereof; the housing 45 being laterally slotted as indicated at 46 to permit freedom of lateral movements of the upper end of the control stick in conjunction with pilot-actuation of the aileron or other turn control surfaces of the airplane.

It will be appreciated that a particular feature and advantage of the invention is that the control stick device thereof is so shaped and arranged as to enable it to be employed in an airplane passenger compartment in such manner as to substantially avoid interferences with passenger and pilot access to and from the airplane, while at the same time being adapted to provide a new and improved degree of pilot comfort and ease of control technique. Also, the control stick device is of such simple structural form as to be readily adapted to be light weight yet rugged and economical to manufacture such as by bending a single length of metal tube stock into the required configuration.

Although only one form of the invention has been shown and described in detail it will be apparent to those skilled in the art that the invention is not so limited but various changes may be made therein without departing from the spirit of the invention or the scope of the appended claims.

I claim:

1. A stick type aircraft pilot control unit adapted to be manipulated by an aircraft pilot when seated in the mounting aircraft for actuating the aircraft elevation and turning control surfaces, said unit comprising a single stick-like member having a hand grip portion disposed to extend substantially vertically at a position above the lap of the aircraft pilot, a first stick body portion formed to extend forwardly from said hand grip portion at an elevation above the normal position of the legs of the pilot when seated within the aircraft, a second stick body portion integral with the first stick body portion and extending from the forward end thereof in a direction downwardly and rearwardly therefrom, a bearing engaging said second stick body portion at its lower end so as to permit said stick-like member to rotate about a vertically inclined axis, said bearing being mounted relative to the aircraft frame by means of a pivot device having its pivoting axis extending horizontally and transversely of the aircraft for fore-and-aft rocking of said stick-like member, said pivot device being disposed at a position substantially underneath said stick hand grip portion when said control device is in neutral position, means carried by said second stick body portion and adapted to be connected to motion transmitting means extending from the turning control means of said aircraft for adjusting the latter in response to sidewise displacements of said stick hand grip portion by the pilot, and second means carried by said unit and adapted to be connected to motion transmitting means extending from the aircraft elevation control means for adjustment of the latter in response to rocking of said stick-like member by the pilot in fore-and-aft directions.

2. A stick type airplane control device adapted to be manipulated by an airplane pilot seated within the mounting airplane for actuating the airplane elevation and turning control surfaces, said device comprising a single stick-like member having a hand grip portion disposed to extend substantially vertically, a first stick body portion extending forwardly from said hand grip portion at an elevation above the normal position of the legs of the airplane pilot when seated within the airplane, a second stick body portion integral with the first stick body portion and extending from the forward end thereof in a direction downwardly and rearwardly therefrom, a bearing bracket engaging said second stick body portion at the lower rear end thereof so as to permit said stick-like member to rotate about the longitudinal axis of said second stick body portion, said bearing bracket being mounted upon a pivot connection device having its pivot axis extending substantially horizontally and transversely of the airplane, a horn extending radially from said second stick body portion to rotate therewith and adapted to be connected at its free end to motion transmitting means extending from the turning control means of said airplane for adjusting the latter in response to sidewise displacements of said stick hand grip portion by the pilot, and a second horn integral with said bearing bracket for connection with motion transmitting means extending from the airplane elevation control means for adjustment of the latter in response to rocking of said stick-like member by the pilot in fore-and-aft directions.

3. A stick type airplane control device adapted to be manipulated by an airplane pilot when seated within an airplane for actuating the airplane elevation and turning control surfaces, said device comprising a single stick-like member having a hand grip portion disposed to extend substantially vertically at a position above the lap of the airplane pilot, a first stick body portion extending forwardly from said hand grip portion at an elevation above the normal position of the legs of the airplane pilot when seated within the airplane, a second stick body portion integral with the first stick body portion and extending from the forward end thereof in a direction downwardly and rearwardly therefrom into the region of the airplane floor line, a bearing bracket engaging said second stick body portion at the lower end thereof so as to permit said stick-like member to rotate about the longitudinal axis of said second stick body portion, said bearing bracket being mounted upon a pivot connection device having its pivot axis extending transversely of the direction of the rotation axis of said stick-like member, a horn extending radially from said second stick body portion to rotate therewith and adapted to be connected at its free end to motion transmitting means extending from the turning control means of said airplane for adjusting the latter in response to sidewise displacements of said stick hand grip portion by the pilot, and a second horn integral with said bearing bracket for connection with motion transmitting means extending from the airplane elevation control means for adjustment of the latter in response to rocking of said stick-like member by the pilot in fore-and-aft directions.

4. A stick type airplane pilot control unit adapted to be manipulated by an aircraft pilot when seated in the mounting aircraft for actuating airplane elevation and turning control surfaces, said unit comprising a single stick-like member having a hand grip portion disposed at a position above the lap of the airplane pilot, a first stick body portion extending forwardly from said hand grip portion at an elevation above the normal position of the legs of the pilot when seated within the airplane, a second stick body portion integral with the first stick body portion and extending from the forward end thereof in a direction downwardly and rearwardly therefrom, a bearing engaging said second stick body portion at its lower end so as to permit said stick-like member to rotate about an axis with a vertical component, said bearing being mounted relative to the airplane frame by means of a pivot device having its pivoting axis extending horizontally and transversely of the airplane for fore-and-aft rocking of said stick-like member, means carried by said second stick body portion and adapted to be connected to motion transmitting means extending from the turning control means of said airplane for adjusting the latter in response to sidewise displacements of said stick hand grip portion by the pilot, and second means carried by said bearing and adapted to be connected to motion transmitting means extending from the airplane elevation control means for adjustment of the latter in response to rocking of said stick-like member by the pilot in fore-and-aft directions.

5. A stick type airplane pilot control unit adapted to be manipulated by an aircraft pilot when seated in the mounting aircraft for actuating the airplane elevation and turning control surfaces, said unit comprising a single stick-like member having a hand grip portion disposed at a position above the lap of the airplane pilot, a first stick body portion extending forwardly from said hand grip portion at an elevation above the normal position of the legs of the pilot when seated within the airplane, a second stick body portion integral with the first stick body portion and extending from the forward end thereof in a direction downwardly therefrom, first mounting means engaging said stick-like member at its lower end so as to permit said member to rotate about an inclined axis, second mounting means engaging said first mounting means for pivotally supporting said first mounting means about an axis extending horizontally and transversely of the airplane for fore and aft rocking of said stick-like member, connection means extending from said second stick body portion and adapted to be connected to motion transmitting means extending from the turning control means of said airplane for adjusting the latter in response to sidewise displacements of said stick hand grip portion by the pilot, and second connection means extending from said first mounting means and adapted to be connected to motion transmitting means extending from the airplane elevation control means for adjustment of the latter in response to rocking of said stick-like member by the pilot in fore-and-aft directions.

6. A stick type airplane pilot control unit adapted to be manipulated by an aircraft pilot when seated in the mounting aircraft for actuating the airplane elevation and turning control surfaces, said unit comprising a single stick-like member having a hand grip portion disposed at a position above the lap of the airplane pilot, a first stick body portion extending forwardly from said hand grip portion at an elevation above the normal position of the legs of the pilot when seated within the airplane, a second stick body portion integral with the first stick body portion and extending from the forward end thereof in a direction downwardly therefrom, first mounting means engaging said stick-like member at its lower end so as to permit said member to rotate about an inclined axis, second mounting means engaging said first mounting means for pivotally supporting said first mounting means about an axis extending horizontally and transversely of the airplane for fore-and-aft rocking of said stick-like member, connection means extending from said second stick body portion and adapted to be connected to motion transmitting means extending from the turning control means of said airplane for adjusting the latter in response to sidewise displacements of said stick hand grip portion by the pilot, and second connection means extending from said first mounting means and adapted to be connected to motion transmitting means extending from the airplane elevation control means for adjustment of the latter in response to rocking of said stick-like member by the pilot in fore-and-aft directions, said first and second mounting means being arranged so that the axes of stick-like member sidewise displacements and fore-and-aft rocking are regionally coincident.

7. A stick type aircraft pilot control device comprising a single stick-like member having a hand grip portion disposed at a position above the lap of the airplane pilot when seated, a first stick body portion extending initially forwardly and downwardly from said hand grip portion at an elevation above the normal position of the legs of the airplane pilot when seated within the airplane and thence bent downwardly and rearwardly, means engaging said stick-like member at the lower end thereof so as to permit said stick to rotate simultaneously about a forwardly and upwardly inclined axis and about an axis extending horizontally and transversely of the aircraft, first means adapted to be connected to the turning control means of said aircraft for adjusting the latter in response to sidewise displacements of said stick hand grip portion by the pilot, and a second means adapted to be connected to the aircraft elevation control means for adjustment of the latter in response to rocking of said stick-like member by the pilot in fore-and-aft directions.

JOSEPH M. GWINN, Jr.

REFERENCES CITED

The following references are of record in the file of this patent:

UNITED STATES PATENTS

| Number | Name | Date |
|---|---|---|
| 1,216,577 | Lang | Feb. 20, 1917 |
| 2,035,231 | Habestro | Mar. 24, 1936 |
| 1,874,522 | Henrichsen | Aug. 30, 1932 |

FOREIGN PATENTS

| Number | Country | Date |
|---|---|---|
| 733,426 | France | July 11, 1932 |
| 56,153 | Denmark | Apr. 24, 1939 |